United States Patent Office.

J. C. CAMPBELL AND M. V. CAMPBELL, OF SYRACUSE, NEW YORK.

Letters Patent No. 73,434, dated January 21, 1868.

IMPROVED COMPOUND FOR PAVEMENTS.

*The Schedule referred to in these Letters Patent and making part of the same.*

TO ALL WHOM IT MAY CONCERN:

Be it known that we, J. C. CAMPBELL and M. V. CAMPBELL, of the city of Syracuse, in the county of Onondaga, and State of New York, have invented a new and improved Compound for Pavement; and we do hereby declare that the following is a full, clear, and exact description thereof, which will enable those skilled in the art to make and use the same, reference being had to the accompanying ingredients, and specimen of the compound.

Our improved compound consists in the following ingredients and relative proportions, namely:

One bushel of gravel, one-quarter bushel of coal-ashes, one-eighth bushel of ground charcoal, one-eighth bushel of ground plaster, five pounds of cast-iron filings or borings, three gallons of coal-tar.

These ingredients are thoroughly mixed together, and the coal-tar added while hot. The foundation for the pavement is a loose bed of gravel, the surface of which is carefully brought into shape, and a coating, of about two inches in thickness, of the compound, as above, then applied while hot. The whole is then sprinkled over with sand, and rolled to a fair surface, as usual.

The relative proportions of the ingredients may be varied somewhat, but the above quantities are substantially the proper proportions.

Having thus described our invention, what we claim as new, and desire to secure by Letters Patent, is—

We claim the within compound of gravel, coal-ashes, ground charcoal, ground plaster, cast-iron filings or borings, and coal-tar, as and for the purpose set forth.

J. C. CAMPBELL,
M. V. CAMPBELL.

Witnesses:
C. E. WARNER,
F. A. MORLEY.